United States Patent
Taylor et al.

[11] 3,833,287
[45] Sept. 3, 1974

[54] GUEST-HOST LIQUID CRYSTAL DEVICE

[75] Inventors: Gary Newton Taylor, Fanwood; Donald Lawrence White, Bernardsville, both of N.J.

[73] Assignee: Bell Telephone Laboratories, Incorporated, Murray Hill, N.J.

[22] Filed: Mar. 8, 1973

[21] Appl. No.: 339,368

[52] U.S. Cl. .......................... 350/160 LC, 252/408
[51] Int. Cl. ............................................. G02f 1/36
[58] Field of Search .............. 350/160 LC; 252/408

[56] References Cited
UNITED STATES PATENTS
3,652,148  3/1972  Wysocki et al. ................. 350/160 X
3,703,329  11/1972  Castellano ................ 350/160 LC X OTHER PUBLICATIONS
Fergason, "Liquid Crystals in Nondestructive Testing," Applied Optics, Vol. 7, No. 9, September 1968, p. 1,730.

Buckingham et al. "The Addition of Optically Active Compounds to Nematic Liquid Crystals," Chem. Phys. Let., Vol. 3, No. 7, July 1969, pp. 540–541.

Primary Examiner—Edward S. Bauer
Assistant Examiner—Matthew W. Koren
Attorney, Agent, or Firm—L. C. Canepa

[57] ABSTRACT

A pleochroic material is dissolved in a helically ordered liquid crystal mixture to form a thin film which selectively absorbs unpolarized incident light. In the absence of an electric field through the film, virtually all of the unpolarized light is absorbed by the film, even without the use of an auxiliary polarizer. When an electric field is applied to the film, the molecules thereof are reoriented to a nonabsorbing state. This electrically controlled absorption phenomenon is the basis for an advantageous display device.

5 Claims, 3 Drawing Figures

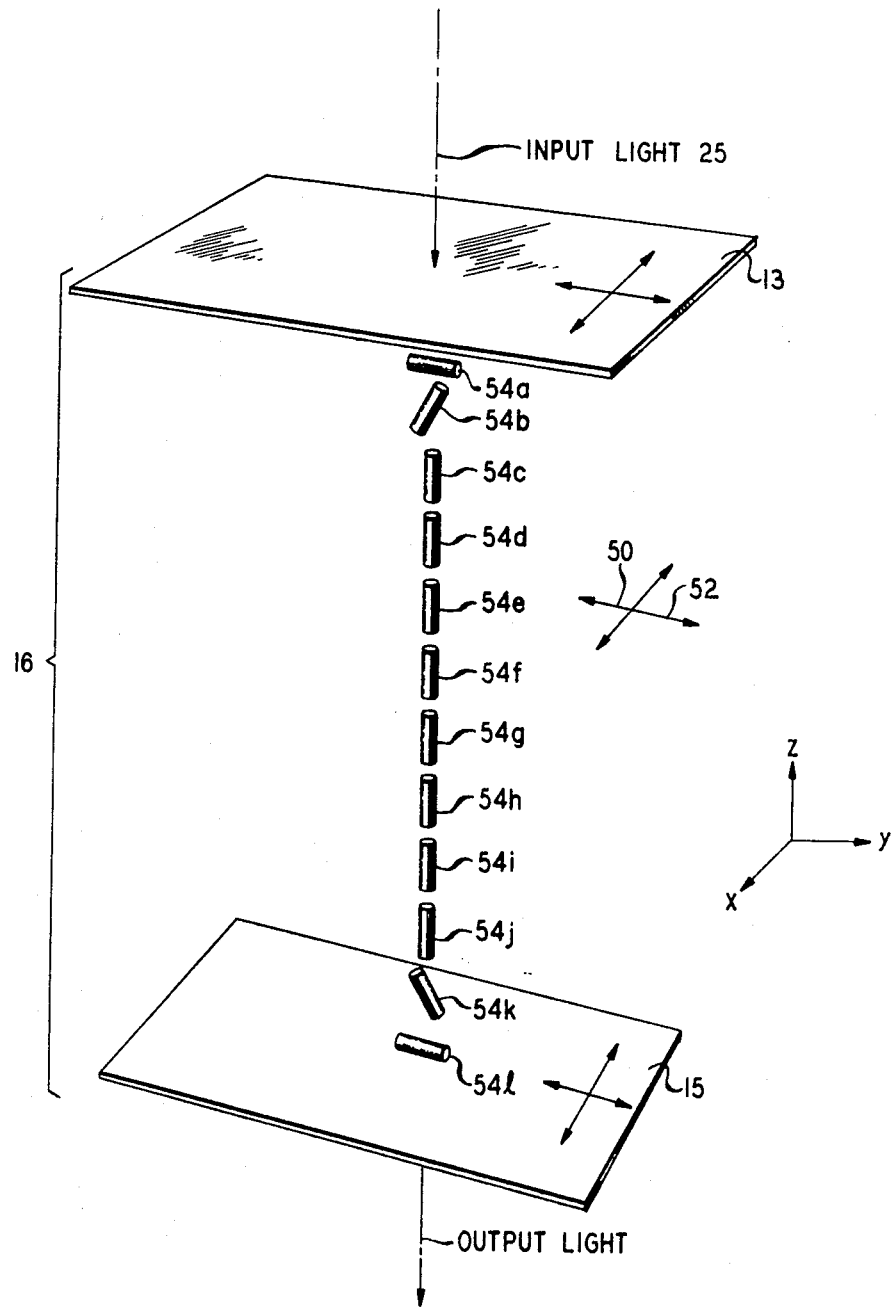

GUEST-HOST LIQUID CRYSTAL DEVICE

BACKGROUND OF THE INVENTION

This invention relates to liquid crystals and more particularly to an electro-optical device that includes a thin film of a host liquid crystal material in which a pleochroic guest material is dissolved.

It is known that the alignment of an electric field of certain host compounds, such as nematic liquid crystals, can be used to orient guest molecules dissolved in the host. This field-response orientation results in controlled changes in the absorption spectrum of the guest material. In this way electrically controlled devices suitable, for example, for display purposes can be constructed. (For a description of a typical such device see "Guest-Host Interactions in Nematic Liquid Crystals: A New Electro-Optic Effect," by G. H. Heilmeier, *Applied Physics Letters*, Aug. 1, 1968, pages 91–92, and G. H. Heilmeier U.S. Pat. No. 3,551,026, issued Dec. 29, 1970.)

Display devices of the guest-host type as heretofore constructed include auxiliary polarizers. In the so-called dark state of such a prior art device, the auxiliary polarizer absorbs one polarization of incident light and the host material dissolved in the liquid crystal material absorbs the other polarization. To achieve the bright state of such a device, the host molecules, and thereby the guest molecules also, are oriented by an electric field to assume their nonabsorbing state. But, even in this latter state, the auxiliary polarizer absorbs more than half of the incident light. As a result, the brightness characteristic of such known guest-host devices leaves much to be desired.

SUMMARY OF THE INVENTION

An object of the present invention is an improved liquid crystal device.

More specifically, an object of this invention is a simplified liquid crystal display device that is characterized by relatively high brightness even with only ambient illumination.

Briefly, these and other objects of the present invention are realized in a specific illustrative embodiment thereof in which an optically active material is added to a nematic liquid crystal material to impart to the mixture a helical molecular structure. The molecules of a pleochroic material dissolved in the host mixture are also ordered by this helical configuration thereby forming a cooperatively aligned guest-host system. In turn, the helical molecular ordering gives rise to an elliptical dichroism in the guest-host material for light propagating parallel to the helical axis.

In the absence of an applied electric field, the guest-host material inherently propagates incident unpolarized light in two normal modes which are right- and left-handed elliptically polarized. The orientation of the electric vectors representative of these modes is such with respect to the longitudinal axes of the guest molecules that approximately 95 percent of the incident light is absorbed by the guest material without the use of an auxiliary polarizer. Consequently, the guest-host material assumes a relatively dark state.

In response to the application of an electric field to the illustrative device, the helical ordering of the guest-host material is unwound to produce a homeotropic molecular orientation. In this second-mentioned orientation relatively little of the incident light is absorbed by the great molecules, and, accordingly, the guest-host material appears relatively bright.

Accordingly, a feature of the present invention is that, in the absence of an applied electric field, a thin film of a guest-host material formulated to exhibit a helical molecular ordering which inherently, without the use of an auxiliary polarizer, absorbs incident unpolarized light to produce a relatively dark display. Moreover, it is a feature of this invention that an electric field is effective to convert the molecular ordering of the guest-host film to the homeotropic mode in which very little of the incident light is absorbed, thereby producing a relatively bright display.

BRIEF DESCRIPTION OF THE DRAWING

FIGS. 2 and 3 depict the molecular orderings and corresponding light propagation modes that exist in the liquid crystal film of the FIG. 1 device in the absence and presence, respectively, of an applied electric field.

DETAILED DESCRIPTION

Figure 1:
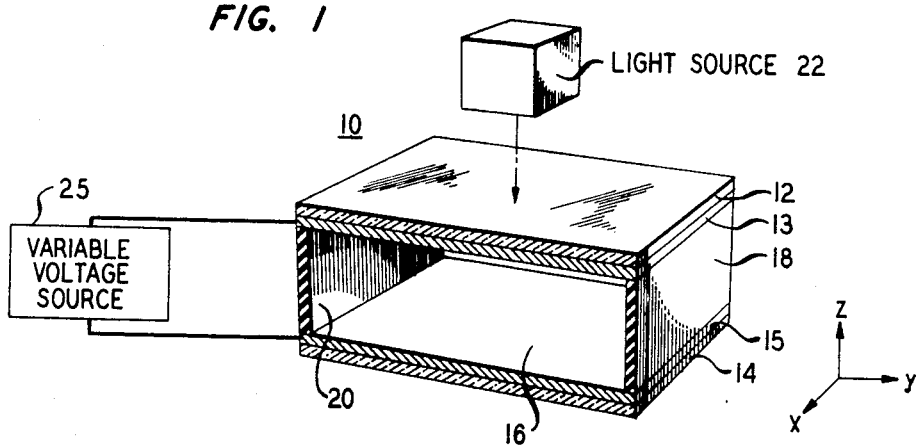
FIG. 1 is a diagrammatic representation of a specific liquid crystal device made in accordance with the principles of the present invention.

The specific illustrative liquid crystal device shown in FIG. 1 includes two parallel glass plates 12 and 14 having a thin dye-liquid crystal film 16 sandwiched between them. Thin conductive coatings 13 and 15 of, for example, $IN_2O_3 - SnO_2$ on the respective facing surfaces of the plates 12 and 14 provide transparent electrodes by means of which a uniform electric field can be established through the depicted film 16. Spacers 18 and 20 made, for example, of a glass frit or a polymer such as Mylar or Teflon maintain the thickness of the film at any desired value in a range of approximately 5 to 30 microns measured in the z direction.

Light source 22 shown in FIG. 1 comprises, for example, a conventional light bulb that provides ambient illumination for the device 10.

In accordance with the principles of the present invention, the film 16 included in the device 10 of FIG. 1 includes as one main component thereof a liquid crystal material that exhibits helical molecular ordering. This component may comprise, for example, a cholesteric liquid crystal material of the type described by F. J. Kahn in "Cholesteric Liquid Crystals for Optical Applications," *Applied Physics Letters*, March 1971, pp. 231–233.

However, for reasons set forth below, it is generally advantageous to constitute the liquid crystal material in the film 16 as a mixture of a nematic liquid crystal and an optically active material such as, for example, a cholesteric material of the type described in the aforecited Kahn article. (The term "optically active" is employed herein to characterize a material in which the plane of polarization of linearly polarized light is rotated as the light passes through the material.) Other examples of optically active materials suitable for inclusion in the mixture are the active amyl ester of N-(p-cyanobenzylidene-p-aminocinnamic acid), hereafter designated CBACAA, the active amyl ester of N-(p-carboxybenzylidene)-p-aminobenzonitrile and *l*-menthol. Advantageously, the molecules of the optically active material should be similar to the host liquid crystal (i.e., long and rod-like), as is the case with CBACAA.

Such a mixture exhibits a helical molecular structure whose pitch is a function of the relative concentrations of the nematic liquid crystal material and the optically active material. More specifically, if the densities of the mixed substances differ only slightly, the ratio of the pitch of the pure optical active material to that of the mixture will be equal to the concentration of the optically active component of the liquid crystal mixture.

Accordingly, by employing such a mixture, it is possible in effect to formulate a substance whose helical pitch assumes any desired value. This provides an important design flexibility that makes it possible to tailor the switching voltage and contrast ratio properties of the device 10 to meet the requirements of various specific applications.

It is characteristic of such a mixture that it exhibits a different structural order property than do cholesterics or mixtures of cholesterics alone. In turn, this property is the basis for maximizing the anisotropy and absorption characteristics of the thin film 16.

One advantageous liquid crystal mixture made in accordance with the principles of this invention for inclusion in the device 10 of FIG. 1 comprises a nematic liquid crystal mixture having positive dielectric anisotropy mixed with an optically active material such as the aforementioned CBACAA. The nematic liquid crystal mixture comprises, for example, equal parts by weight of the N-(P-butoxy), N-(p-hexyloxy), and N-(p-octanoyloxy)-benzylidine-p-aminobenzonitriles, or mixtures of 4-N-(4'-n-hexylbenzylidene)-aminobenzonitrile and 4-N-(4'-n-propylbenzylidene)-aminobenzonitrile, or mixtures of 4'-cyanophenyl-4-n-butylbenzoate and 4'-cyanophenyl-4-n-heptylbenzoate, as reported by A. Boller, H. Scherrer, M. Schodt and P. Wild, "Proc. of the I.E.E.E.," 60 1002 (1972). Mixtures of the nematic liquid crystal and the optically active material in the range of about 5 to 15 percent by weight of the optically active material imparted to the mixture a helical molecular ordering with a pitch value of about 1.0 to 3 microns.

Both of the aforementioned materials included in the liquid crystal mixture include rod-like molecules and exhibit a positive dielectric anisotropy. In such a material the electric susceptibility parallel to the longitudinal axis of a molecule thereof is greater than the electric susceptibility perpendicular to the longitudinal molecular axis.

When the helical pitch of the mixture approximates the wavelength of visible light directed at the thin film 16, the film propagates through the film in right- and left-handed elliptically polarized modes. When the pitch exceeds about 5 to 10 wavelengths, the mixture appears to the incident light very much like a nonhelical nematic-type structure which propagates linearly polarized modes. In accordance with the principles of the present invention, this second-mentioned propagation mode is to be avoided in the absence of an electric field of the film 16. Hence, as a practical manner, the pitch of the mixture is usually designed to be less than about 5 wavelengths of the incident visible light.

The pitch of the helical configuration of the aforedescribed mixture should not be made much less than a wavelength of the incident visible light. If it is made much less, the voltage required across the film 16 to establish an electric field therein sufficient to unwind the helix may be too large for some applications of practical importance. Accordingly, the pitch is usually designed not to be less than about 1 wavelength.

In accordance with the principles of this invention, the second main component included in the thin film 16 is a pleochroic material such as, for example, a soluble nonionic dye. One such suitable dye is 2-(2-N,N-diethylaminoazophenyl)-5-nitrothiazole mixed in the liquid crystal mixture in a concentration of about ¼ to 1 percent by weight of the dye.

It is characteristic of such a dye that it absorbs light preferentially: its optical absorption spectrum is a strong function of the polarization of the incident light with respect to the orientation of the dye molecules. Specifically, when the electric vector representative of light polarization is parallel to the longitudinal axis of such a dye molecule, the molecule is relatively absorptive of that portion of the incident light whose wavelengths fall within a prescribed range. As a result of this absorption, the dye molecules dispersed in the film 16 exhibit a characteristic color. The device is then said to be in its dark state. On the other hand, when the electric vector of the incident light is perpendicular to the longitudinal axis of such a dye molecule, the molecule appears relatively transparent. Accordingly, under that set of circumstances, the film 16 or some preselected localized portion thereof assumes a relatively clear or bright state.

Figure 2:
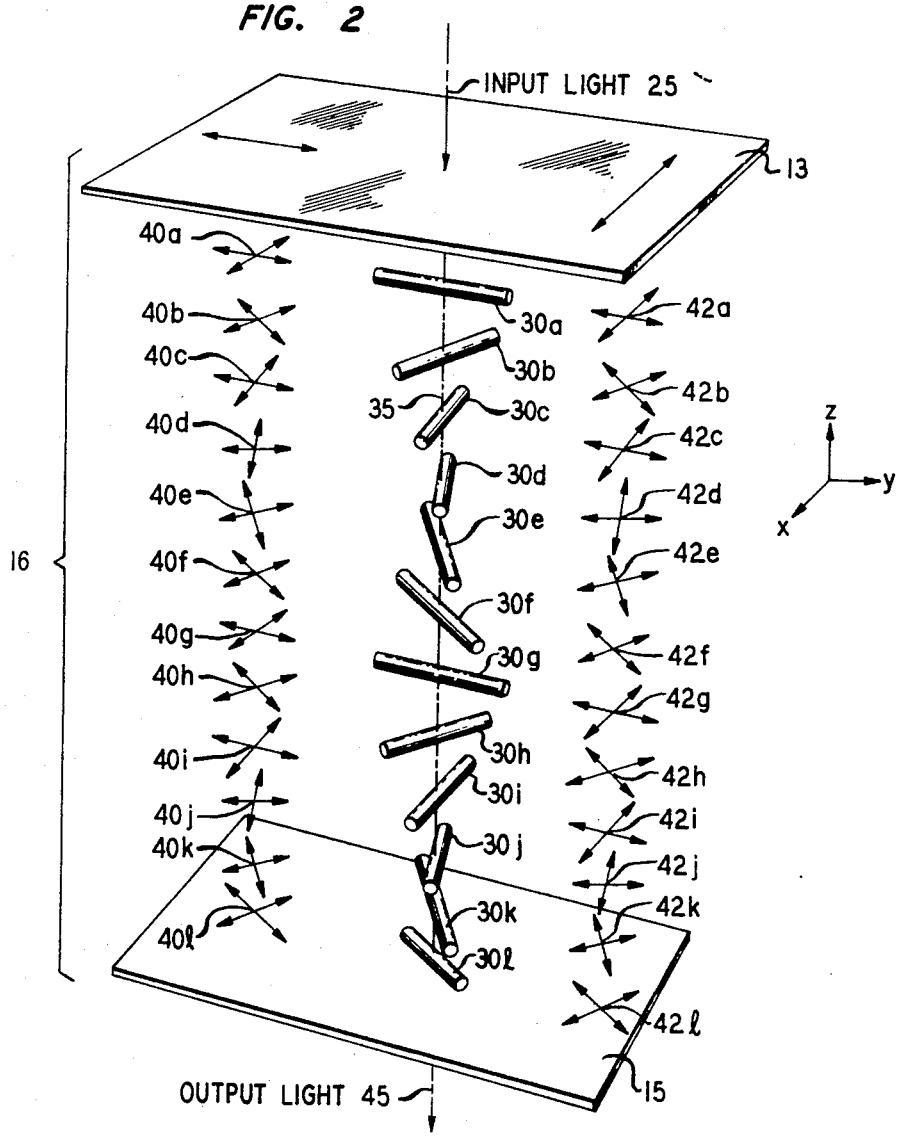

The absorption phenomenon characteristic of the present invention can be better understood by considering FIGS. 2 and 3, which schematically depicted the conductive coatings 13 and 15 bounding the thin film 16 that comprises the aforedescribed dye-liquid crystal mixture. In each of FIGS. 2 and 3 input (ambient unpolarized) light is represented by a dash-line vector 25 directed at the coating 13.

In FIG. 2 no voltage is assumed to be applied between the coatings or electrodes 13 and 15. Accordingly, no applied electric field is present through the film 16. In this condition the molecules of the liquid crystal mixture, and therefore the molecules of the dissolved dye, assume a helical ordering. Since it is primarily the dye molecules that exhibit the selective absorption characteristic described herein, a representative helix of rod-like dye molecules 30a through 30l, having a helical axis 35, is shown in FIG. 2 for illustrative purposes.

Various techniques are available for insuring that the helical axis 35 of FIG. 2 is initially oriented perpendicular to the planar coatings 13 and 15. For example, by rubbing and/or applying a suitable surfactant to the facing surfaces of the coatings 13 and 15, the top-most and bottom-most molecules of the helical ordering (represented by molecules 30a and 30l in FIG. 2) are directed to be oriented with their longitudinal axes parallel to the xy plane. In turn, this insures that the axis 35 is disposed parallel to the z axis and perpendicular to the planar coatings 13 and 15.

A suitable surfactant for achieving the aforedescribed initial orientation of the helically ordered film 16 is 3-N-methylaminopropyltrimethoxysilane. A uniform layer of surfactant may be obtained by dissolving the designated surfactant in an appropriate aqueous organic solvent and dipping the electrode-coated plates 12 and 14 in the solvent, rinsing off the excess solvent with deionized water and drying (curing) the layer. In accordance with this procedure there is produced a stable cross-linked two-dimensional polymer network.

The noted rubbing step may, for example, involve selectively treating the coatings 13 and 15. Illustratively, the treatment comprises rubbing the coatings with lens paper prior to curing the surfactant-coated surfaces 13 and 15. Rubbing each of the coatings in, for example, the y direction about six times with moderate pressure has resulted in imposing the desired orientation in the thin film 16. In carrying out this treatment, neither the rubbing material, the number of strokes nor the amount of pressure appears to be critical. Grooving of the surfaces by polishing or photolithographic techniques, followed by application of a surfactant, may also be used to aid in establishing the aforedescribed initial molecular ordering, as described in copending applications D. W. Berreman-D. L. White U.S. Pat. application Ser. No. 265,458, now abandoned and D. W. Berreman-S. Meiboom-D. L. White U.S. Pat. application Ser. No. 265,459, which issued on Jan. 22, 1974, as Pat. No. 3,787,110 both filed June 23, 1972.

It is characteristic of a helically ordered dye-liquid crystal film 16 of the type described herein that, in the absence of an applied electric field, unpolarized light propagates therethrough in two elliptical modes. These modes, which are designated right- and left-handed helically polarized modes, are represented in vector form in FIG. 2. Thus, input light transmitted through the transparent coating 13 propagates through the film 16 in two modes that are represented by two sets of crossed vectors 40a through 40l and 42a through 42l, respectively.

It is apparent from FIG. 2 that the longer vector of each pair of vectors 40a through 40l maintains a tracking parallel relationship with the dye molecules 30a through 30l, respectively, as the light propagates through the film 16 in the z direction. As a result, almost all of the energy contained in that mode is absorbed by the dye molecules.

Similarly, it is seen from FIG. 2 that the shorter vector of each pair of vectors 42a through 42l maintains a parallel relationship with the dye molecules 30a through 30l, respectively, as that portion of the light represented by the other elliptical mode propagates through the film 16. As a result of this interaction, much of the energy stored in this other mode is depleted during traversal of the film 16.

In practice it has been observed that, in the no-field case represented in FIG. 2, only about 5 to 10 percent of the input light directed through the transparent coating 13 is transmitted through the transparent coating 15 of the device 10 to appear as output light (vector 45).

In the FIG. 3 depiction a voltage is assumed to be applied between the coatings 13 and 15. (A source 25 is shown in FIG. 1 for applying variable voltages between the coatings.) This voltage may be either d.c. or a.c. in nature. For a.c. operation, frequencies up to about 50 kHz may be used, with frequencies of 30 to 1,000 Hz being preferred. When the applied voltage reaches a point at which the corresponding field in the film 16 reaches a so-called transition value, the aforementioned helical molecular ordering is in effect unwound to establish a homeotropic molecular ordering, as represented in FIG. 3. For thicknesses and helical pitches having values in the ranges discussed above, a.c. voltages of about 10 to 30 volts rms are effective to accomplish such molecular reordering.

When the molecular ordering is as shown in FIG. 3, it is characteristic of the film 16 included in the device 10 that the film propagates light in linearly polarized modes. Over most of the thickness of film 16 electric vectors 50 and 52 representative of such modes are perpendicular to the longitudinal axes of dye molecules 54a through 54l. Hence, relatively little of the propagating light is absorbed in the film 16 during transit therethrough. In practice it has been observed that about 55 to 60 percent of the incident light is transmitted through the device 10 when the dye molecules in the film 16 are ordered as shown in FIG. 3.

The device 10 shown in FIG. 1 may be operated in the so-called transmission mode, which has been implied in the discussion so far. In that operating mode the light source 22 is disposed on one side of the device and an observer, i.e., a human being, would position himself on the other side of the device to view light transmitted through the transparent plate 14. Alternatively, the top surface of the layer 15 may be coated with a highly reflecting material, for example, silver. In that case the observer would position himself to view light that is reflected from such a coating and then transmitted back through the upper plate 12 of FIG. 1. In other words in that operating mode, the reflection mode, both the source 22 and the observer are located on the same side of the device 10.

In a manner well known in the art, the device 10 may be fabricated with two mating seven-segment electrodes thereby to form a device for displaying any single numeral from zero through nine. (See, for example, page 100 of the April 1970 issue of *Scientific American* for a depiction of this type of numerical indicator.) Such electrodes, when associated with conventional means for applying voltages between selected corresponding segments, are effective to switch specified portions of the film 16 to their relatively clear state.

Additionally, by forming each of the electrodes 13 and 15 to comprise a plurality of spaced-apart row and column conductors, a matrix of switchable regions in the film 16 may be defined. Then, by energizing selected row and column conductors, utilizing conventional selection circuits known in the art, the constituent elements of any desired pattern can be selected for display.

Moreover, it is feasible to apply selectively a spatially varying electric field to the film 16 of the device 10 in other ways known in the art. For example, by placing a photoconductive layer in series with the film 16 and projecting a so-called signal-light image on the photoconductor, it is possible to construct another class of display device. A device of this type is described, for example, in "Liquid Crystal Light Valves," by D. L. White and M. Feldman, *Electronics Letters*, Dec. 31, 1970, pages 837–839.

When the helical axes of the film 16 are homeotropic and selected portions of the film are clear due to the application of a voltage, as represented in FIG. 3, a short-term storage effect (on the order of 20 seconds) results upon removal of the electric field. The "storage" state is turbid and scatters light. In other words, the selected portions of the film 16 become turbid and look different from the rest of the film even after the switching voltage is removed from the electrodes 13 and 15.

For some applications the aforedescribed storage effect may be a useful characteristic. But for other applications it may be advantageous for the device 10 not to exhibit such an effect. In the latter case a simple modification of the procedure for fabricating the device 10 achieves the desired result of minimizing the storage effect.

This modification involves establishing initially in the film 16 a helical ordering in which the helical axes in the immediate vicinity of the electrodes 13 and 15 lie in a plane parallel to the $xy$ plane. This alternative arrangement is achieved by applying to the coatings 13 and 15 a surfactant, for example N,N-dimethyl-N-octadecyl-3-aminopropyltrimethoxysilyl chloride, which causes the surface molecules of the film 16 to align with their longitudinal axes perpendicular to the coatings. Even with such an imposed surface alignment, however, major bulk portions of the film 16 are characterized by a helical ordering whose axes are on the average at an angle to the coatings. Hence, the aforedescribed absorption phenomenon will still occur in the film to a considerable extent in the absence of an applied electric field. When an electric field is applied to such a device, the bulk helical ordering is unwound and as a result the film 16 is relatively transmissive. But when the applied field is removed from such an alternative arrangement, the film 16 almost immediately exhibits both absorption and scattering of incident light. This is a stable no-field effect which will exist for weeks and which causes the film to present a milky or cloudy appearance. Switching of the modified device between its clear and cloudy states may be done in a relatively high speed manner.

An important factor for achieving high contrast ratio and brightness in a device of the type described herein is that the transition moment vector of the pleochroic guest have an orientation with respect to the crystallographic axis of the liquid crystalline host that is most nearly parallel thereto. Ideally the transition moment axis of the dye molecule should be most nearly parallel to its long molecular axis. The order of the dye relative to that of the liquid crystal optic axis depends on the order of the liquid crystal host molecules and the nature of the dye molecules. By selection of appropriate dye molecules, the ordering of the dye molecules may be greater than that of the host molecules. Dyes which exemplify this characteristic are the aforementioned 2-(4-N,N-diethylaminoazophenyl)-5-nitrothiazole and, in addition, the nematic liquid crystalline dye N-(p-methoxybenzylidene-1-amino-4-(4'-cyanophenylazo) napthalene. Classes of elongated dyes which also meet this requirement are azoic dyes, azo dyes, quinone dyes, merocyanine dyes, disperse dyes and liquid crystalline dyes.

It is to be understood that the above-described structures are only illustrative of the application of the principles of the present invention. In accordance with these principles, numerous other arrangements may be devised by those skilled in the art without departing from the spirit and scope of the invention. For example, in a reflection-type cell the mirror may be the back electrode 15 in FIG. 1, or the mirror may be placed externally. The mirror may be diffuse or specular. In addition, there may be additional coatings of transparent material between the film 16 of FIG. 1 and the electrodes 13 and 15 to protect the electrodes from electrochemical reactions with the material of the film.

What is claimed is:

1. A device which is responsive to the absence or presence of an electric field for either absorbing or transmitting, respectively, unpolarized light incident thereon, said device comprising
   a liquid crystal host material characterized by a helical molecular ordering in the absence of an electric field and a homeotropic molecular ordering in the presence of an electric field,
   a pleochroic guest material in said host material to form a mixture in which said host and guest materials assume corresponding molecular orderings, said guest material being absorptive of said light when helically ordered and nonabsorptive of said light when homeotropically ordered, wherein said guest-host material comprises a thin film having a thickness in the range 5 to 30 microns, wherein said host material comprises a nematic liquid crystal material mixed with an optically active material, and wherein said guest material comprises a soluble nonionic dye,
   and further including two conductive electrodes positioned respectively adjacent opposing surfaces of said film.

2. A device as in claim 1 further including a source connected to said electrodes for applying a variable voltage therebetween.

3. In combination in an electro-optic device,
   a guest-host liquid crystal mixture whose molecular ordering is characterized by a helical configuration in the absence of an electric field established in the mixture and by a homeotropic configuration in the presence of an electric field established therein,
   an electrode means for establishing a variable electric field through said mixture, wherein said mixture includes
   a host material comprising an optically active material and a nematic liquid crystal mixture,
   and a guest material comprising an absorptive pleochroic material.

4. A combination as in claim 3 wherein said guest-host liquid crystal mixture comprises a thin film having a thickness in the range 5 to 30 microns, wherein said aforementioned means comprises
   two planar conductive electrodes in respective contact with opposing surfaces of said film, and further including
   a source connected to said electrodes for applying a variable voltage therebetween.

5. A device which is responsive to the absence of presence of an electric field for either absorbing or transmitting, respectively, unpolarized light incident thereon, said device comprising
   a liquid crystal host material characterized by a helical molecular ordering in the absence of an electric field and a homeotropic molecular ordering in the presence of an electric field,
   a pleochroic guest material in said host material to form a mixture in which said host and guest materials assume corresponding molecular orderings, said guest material being absorptive of said light when helically ordered and nonabsorptive of said light when homeotropically ordered,
   wherein said guest-host material comprises a thin film,
   and two conductive electrodes positioned respectively adjacent opposing surfaces of said film.

* * * * *

UNITED STATES PATENT OFFICE
CERTIFICATE OF CORRECTION

Patent No. 3,833,287   Dated September 3, 1974

Inventor(s) Gary N. Taylor and Donald L. White

It is certified that error appears in the above-identified patent and that said Letters Patent are hereby corrected as shown below:

Column 1, line 6, "electro-optical" should be --electro-optic--;
Column 1, line 12, "field-response" should be --field-responsive--.
Column 2, line 2, "great" should be --guest--;
Column 2, line 6, after "material" insert --is--.
Column 3, line 8, "optical" should be --optically--.
Column 3, line 52, after "16", change "the film" to --the light--.
Column 4, lines 7 & 8, "2-(2-N,N-diethylaminoazophenyl)" should be --2-(4-N,N-diethylaminoazophenyl)--;
Column 4, line 36, "dash-line" should be --dashed-line--.
Column 5, line 66, after "For" insert --film--.

Signed and sealed this 7th day of January 1975.

(SEAL)
Attest:

McCOY M. GIBSON JR.
Attesting Officer

C. MARSHALL DANN
Commissioner of Patents